W. G. TEMPLETON.
WEIGHING SCALE.
APPLICATION FILED NOV. 10, 1910.

1,032,439.

Patented July 16, 1912.

2 SHEETS—SHEET 1.

Witnesses
Elizabeth Griffith
Catherine P. Brown

Inventor
William G. Templeton

By Church & Church
per J. B. Church
his Attorneys

W. G. TEMPLETON.
WEIGHING SCALE.
APPLICATION FILED NOV. 10, 1910.
1,032,439.
Patented July 16, 1912.
2 SHEETS—SHEET 2.
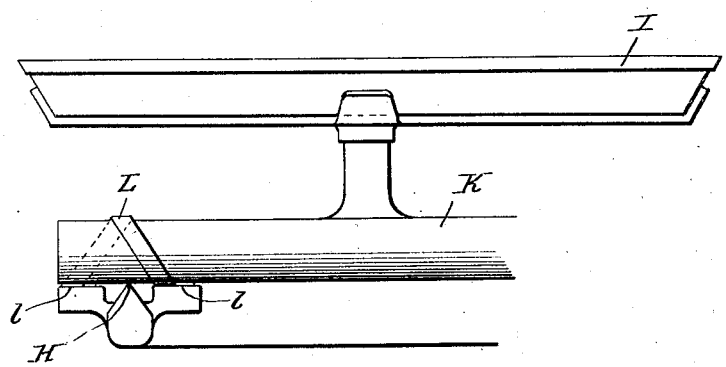
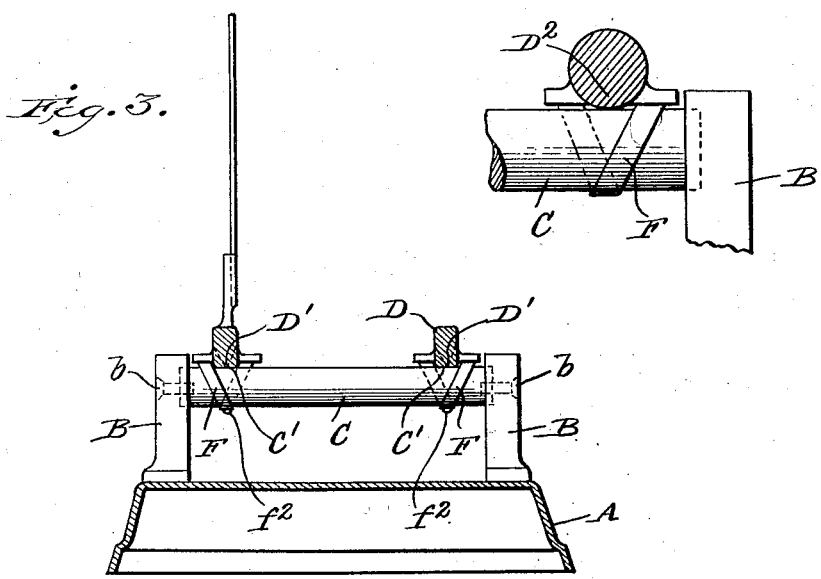
Witnesses
Elizabeth Griffith
Halbert P. Brown
Inventor
William G. Templeton
By Church & Church
per J. B. Church
his Attorneys

UNITED STATES PATENT OFFICE.

WILLIAM G. TEMPLETON, OF COLORADO SPRINGS, COLORADO.

WEIGHING-SCALE.

1,032,439.

Specification of Letters Patent.

Patented July 16, 1912.

Application filed November 10, 1910. Serial No. 591,671.

*To all whom it may concern:*

Be it known that I, WILLIAM G. TEMPLETON, a citizen of the United States, residing at Colorado Springs, in the county of El Paso and State of Colorado, have invented certain new and useful Improvements in Weighing-Scales; and I do hereby declare the following to be a full, clear, and exact description of the same, reference being had to the accompanying drawings, forming a part of this specification, and to the figures and letters of reference marked thereon.

This invention relates to improvements in weighing scales and is applicable or adapted for use in connection with any of the various types of weighing scales employing in their construction a pivoted beam and means whereby a counter-balance member is pivotally connected with the beam, the counter-balance member being either the load support or connection for the goods to be weighed or the support or connection for the weight by which the goods to be weighed are balanced.

The object of the invention is to provide an improved form of pivotal connection or connections between the parts whereby increased sensitiveness and accuracy are secured, the construction of the parts simplified, the cost of production reduced, and the life of the connections prolonged by reducing the wear incident to use and distributing such wear as may occur in a manner which will preserve the accuracy and sensitiveness of the scale.

The invention consists in certain novel details of construction and combinations and arrangements of parts, all as will be now described and pointed out particularly in the appended claims.

Figure 1:
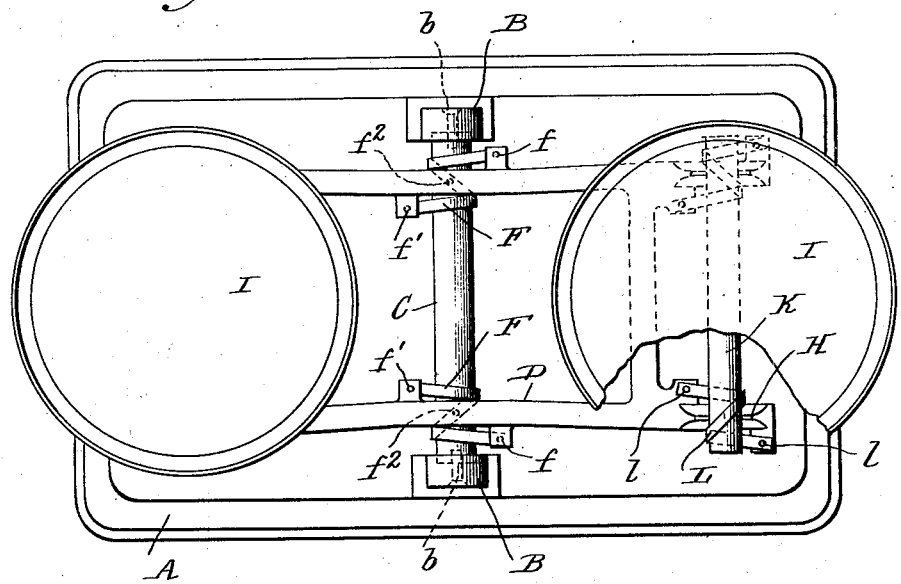
Figure 2:
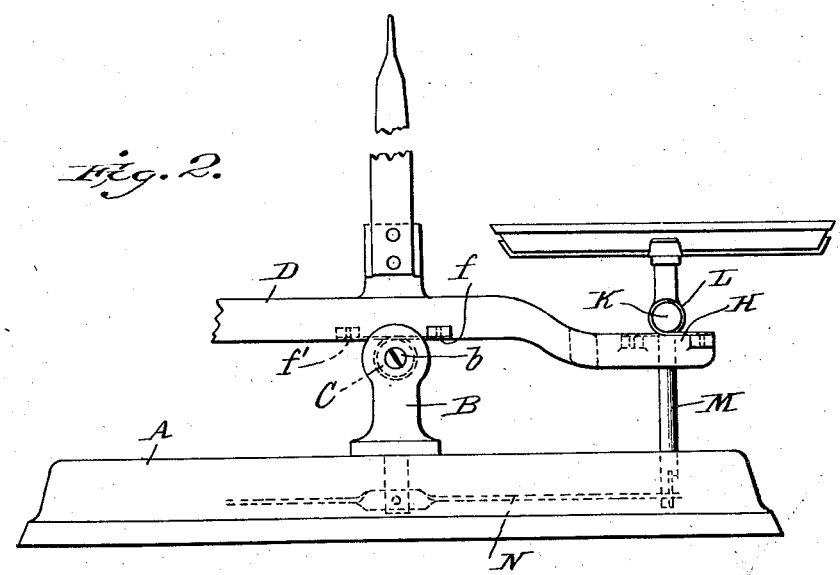

Referring to the accompanying drawings which illustrate a simple form of even-balance scale in which the present invention has been embodied—Figure 1 is a top plan view with a portion of one of the counter-balance members broken away to show one of the pivotal connections between said counter-balance member and the beam. Fig. 2 is a side elevation of the scale shown in Fig. 1 with portions broken away. Fig. 3 is a sectional view in a transverse vertical plane showing the intermediate or supporting bearings for the beam. Fig. 4 is a detail sectional elevation showing one of the pivotal connections between the counter-balance member and beam. Fig. 5 is a detail showing a modified form of pivotal connection which may be adapted for either the beam support or for the connection between the beam and counter-balance member.

Similar letters of reference in the several figures indicate the same parts.

The scale adopted for illustrating the present invention is one of the simpler forms of the well-known type of even-balance scales, but it will be understood that the invention is applicable to any scale employing a pivotal beam or pivotal connections between a beam and a counter-balance member or connection through which the load either of the goods to be weighed or the counter-balancing weight is applied to the beam.

In said drawings the letter A indicates the base of the scale from which standards B project upwardly and are adapted for the reception of a transverse member C, said base, standards and transverse member constituting the support for the beam D. The transversely extending member C is provided with upwardly directed or facing cylindrical bearing surfaces at the points where the beam rests thereon as, for instance at the points indicated by the reference letter C′, in Fig. 3, and as a matter of convenience said transverse member C is preferably made in the form of a cylindrical rod or bar which at its ends is rigidly connected with the standards B by screws b. The downwardly facing bearings on the beam which rest upon and coöperate with the cylindrical bearing faces of the support are straight and extend longitudinally of the beam or at right angles to the axis about which the cylindrical bearings of the support are formed. As shown in the drawings the intermediate bottom faces of the beam where they rest on the cylindrical bearings at points indicated by D′ are straight and extend longitudinally of the beam in the same plane. Obviously, the said straight bearings may be narrow so as to form a point contact with the cylindrical bearings or they may be broadened somewhat as shown, for instance, in Fig. 3 so as to make a line contact with the cylindrical bearing, the contact line extending parallel with the axis about which the cylindrical surface is formed. A point contact, for instance, will be formed if the beam be cylindrical in cross section, as shown at D² in Fig. 5, or if formed of V-shape, as will be presently explained in describing the pivotal connection between the beam and counter-balance member.

For preventing displacement of the beam with relation to its support a flexible connection or connections may be provided between said members and in order to prevent the introduction of any element of inaccuracy by reason of such flexible connection or connections the connections lead off from the surface of the cylindrical bearing in a tangential plane which substantially coincides with the plane in which the straight bearings themselves are located. As shown in the drawings a flexible connection, such as the thin metal tape F passes around the cylindrical member C, preferably spirally, and its ends lead away from the cylindrical surface tangentially but in opposite directions, one end being connected with the beam at $f$, for instance, on one side of the bearing point and the other being connected with the beam at $f'$ in a diametrically opposite position with relation to said bearing point, whereby the ends of the flexible connection lead away from the cylindrical bearing in the same plane, regardless of the inclination of the beam and said plane is substantially coincident with the plane in which the straight bearings are located. Preferably the flexible connection is attached to the cylindrical member, as at $f^2$.

In the type of scale illustrated and in accordance with well understood principles of even-balance scale construction, the counter-balance members are supported on opposite ends of the beam itself and the pivotal connections between the counter-balance members and the beam and between the beam and its support should be in substantially the same plane or sufficiently near the same plane to give the scale the desired sensitiveness and without being in unstable balance. The ends of the beam are, therefore, preferably dropped below the level of the intermediate portion and said ends are provided with upwardly facing straight bearings extending longitudinally of the beam and said bearings are preferably of inverted V-shape as shown at H in Figs. 1 and 4. Each counter-balance member I is provided with a cylindrical bearing K which rests upon the longitudinally extending straight bearings H and is adapted to be held against displacement thereon by a flexible connection L which in construction and mode of attachment to the beam and cylindrical bearing corresponds to that described for the flexible connection F; that is to say, said flexible connection L passes spirally around the cylindrical bearing and leads off from the cylindrical bearing surface in opposite directions in a tangential plane which coincides with the plane in which the straight bearing is located, the ends of the flexible connection being attached at $l$ to the beam itself.

Where the flexible connections are arranged spirally it is preferred that the connections at opposite ends of the cylindrical members shall be wound about the same with the pitch of the spirals in opposite directions, that is to say, one is a right and the other a left hand spiral, whereby their effect is balanced one by the other. The spiral arrangement also constitutes the most convenient construction whereby the tangential portions of the flexible connections may be located on opposite sides of the straight bearing.

The counter-balance members I may be provided with downwardly extending projections M to which check rods N of usual construction may be pivotally attached, as is well understood in the art. With a scale provided with pivotal connections such as herein described, it will be noted that the form of the parts is such as to enable them to support a maximum load with a minimum frictional contact face. The contact face by reason of the rocking motion is constantly changing whereby friction and wear at one point is avoided, and the flexible connections between the coöperating members by winding and unwinding during the pivotal movement effectually retain the parts or members in their relative positions without interposing any element of inaccuracy in the operation of the scale. Where the straight bearings face upwardly and the load to be supported thereby is not excessive, it is desirable that they should be made of V-shape as shown in Fig. 4 in order to avoid accumulation of dust or dirt upon the bearing itself, although this feature is not so necessary or desirable where the straight bearing faces are directed downwardly, as shown for instance at the intermediate or supporting bearings for the beam.

The scale presents features of construction which render it highly desirable for use especially in even-balance scale construction, because of the fact that the minute changes in leverage due to the rolling contact between the pivotally connected members cause the scale to come to a balance more readily with the exact load thereupon, as will be readily understood by those skilled in the art.

Having thus described my invention what I claim as new and desire to secure by Letters Patent, is:

1. In weighing scales, a pivotal connection between relatively movable parts embodying a member having a cylindrical bearing face, a member coöperating therewith having a straight bearing extending tangentially from the cylindrical face at right angles to the axis about which the cylindrical face is formed and a flexible connection between said members leading in opposite directions from the cylindrical face and on opposite sides of the straight bearing for retaining the members in operative relation.

2. In weighing scales, a pivotal connection between relatively movable parts embodying a member having a cylindrical bearing face, a member coöperating therewith having a straight bearing extending tangentially from the cylindrical face at right angles to the axis about which the cylindrical face is formed and flexible connections between said members leading in opposite directions from the cylindrical face in a tangential plane substantially alined with and on opposite sides of the straight bearing.

3. In weighing scales, a pivotal connection between relatively movable parts embodying a member having a cylindrical bearing face, a member coöperating therewith having a straight bearing extending tangentially from the cylindrical face at right angles to the axis about which the cylindrical face is formed and spirally arranged flexible connections between said members leading in opposite directions from the cylindrical face and on opposite sides of the straight bearing in a tangential plane substantially alined with the straight bearing.

4. In weighing scales, a beam having downwardly facing intermediate bearings and upwardly facing end bearings all of said bearings extending in straight lines longitudinally of the beam, a support for the beam having cylindrical bearing faces on which the intermediate straight bearings rest, connections between the beam and support for preventing sliding movement of the beam on the support, a counter-balance member having bearings with cylindrical faces resting on the straight bearings at the end of the beam and connections between the counter-balance member and beam for preventing displacement of the said member on the beam.

5. In weighing scales, a beam having downwardly facing intermediate bearings and upwardly facing end bearings, all of said bearings extending in straight lines longitudinally of the beam and in substantially the same plane, a support for the beam having cylindrical bearing faces on which the intermediate straight bearings rest, a counterbalance member having bearings with cylindrical faces resting on the straight bearings at the end of the beam and flexible connections between the beam and support and between the counter-balance member and means leading off from said cylindrical bearing faces in a tangential plane substantially coinciding with the plane in which the straight bearings are located.

WILLIAM G. TEMPLETON.

Witnesses:
I. A. BRAUM,
GEO. W. KEPLER.